United States Patent [19]

Calvert

[11] 4,167,127

[45] Sep. 11, 1979

[54] ANGLE MESHING GEAR

[75] Inventor: Ronald J. Calvert, Edwardstown, Australia

[73] Assignee: Hills Industries Limited, Edwardstown, Australia

[21] Appl. No.: 859,587

[22] Filed: Dec. 12, 1977

[30] Foreign Application Priority Data

Dec. 15, 1976 [AU] Australia ............................ 8496/76

[51] Int. Cl.$^2$ .......................... F16H 1/12; F16H 1/20
[52] U.S. Cl. ..................................... 74/416; 74/462; 74/DIG. 10
[58] Field of Search ................. 74/416, 462, DIG. 10

[56] References Cited

U.S. PATENT DOCUMENTS

| 1,468,794 | 9/1923 | Blodgett | 74/416 |
| 2,346,507 | 4/1944 | Quinn | 74/416 |
| 2,430,129 | 11/1947 | Ligh | 74/416 |

*Primary Examiner*—Henry C. Yuen
*Attorney, Agent, or Firm*—Jay L. Chaskin

[57] ABSTRACT

In lieu of a pair of bevel gears which mesh to rotate about axes inclined to one another, each gear is carried on a cylindrical base having a boss extending from one end and co-axial with the base. Each tooth is integral with both the base and the boss and the adjacent walls of adjacent teeth are parallel for portion of their respective lengths such that the teeth are bulbous. Point engagement exists between the teeth. For a given pair of gears the angle between the axis of rotation can be widely varied.

4 Claims, 3 Drawing Figures

4,167,127

ANGLE MESHING GEAR

This invention relates to an angle meshing gear, which can for example take the place of bevel gears having axes of rotation at right angles.

BACKGROUND OF THE INVENTION

A bevel gear is designed primarily to have an involute tooth form so that a rolling action takes place between meshing teeth, and line contact exists between at least one pair of meshing teeth of two inter-engaging gears at all time during rotation. However there are some difficulties encountered when relatively small gears are required, as for example in the case of the meshing gears between a toothed nut and a handle spindle pinion of a rotary clothes hoist required to interengage for elevation of the upper movable standard.

In the first instance, the length of the teeth is relatively great, and to avoid undercut conditions it is necessary to have more than 13 teeth for an involute form. This in turn means that the teeth are relatively small in size, and consequently are not mechanically strong if formed for example from plastics material. It is desirable that the teeth be relatively large if formed from plastics material so that the danger of fracture at the root is reduced. Bevel gears are essentially precision devices, and will not tolerate large dimensional errors of angle or dimension. Furthermore the cost of forming a die for bevel teeth is relatively high.

The main object of this invention is to provide a satisfactory angle meshing gear which can have relatively large teeth although the gear is of relatively small diameter, and wherein the construction is so simple that the die costs are relatively small.

BRIEF SUMMARY OF THE INVENTION

Briefly in this invention a gear (to be used as an alternative to a bevel gear), has a cylindrical base with a boss extending from one end. Each tooth is integral with both the base and the boss. The adjacent walls of adjacent teeth are parallel for portions of their respective lengths, and the teeth are bulbous.

With this arrangement of adjacent sides of two adjacent teeth being parallel to one another, the axis of recess is radial, so that the side walls are easily formed. This in turn results in an undercut root, and a bulbous tooth form, and when two bulbous tooth forms are in mesh they can mesh with one another over a wide range of intersecting axes, including axes at right angles to one another. This in turn makes possible relatively large teeth which are mechanically strong because of the stiffening of the teeth at their base (at which locality the recesses may be curved to reduce stress concentration) in turn making it feasible to use moulded plastics materials under conditions of high loads.

More specifically in one aspect of this invention, an angle meshing gear comprises a cylindrical base, a boss of smaller diameter than the base, coaxial with the base, and projecting from the base, and a plurality of teeth extending radially from the boss, each tooth having its root integral with the boss and one end, integral with the cylindrical base, adjacent walls of adjacent teeth being substantially parallel for portions of their lengths, the tooth forms being bulbous.

BRIEF DESCRIPTION OF THE DRAWINGS

An embodiment of the invention is described hereunder in some detail with reference to and is illustrated in the accompanying drawings, in which.

DETAILED DESCRIPTION OF THE PREFERRED EMBODIMENT

In this embodiment a toothed nut 10 is arranged to mesh with a handle pinion 11 for the elevation of an elevating standard of a clothes hoist, the axis of rotation of the nut and the axis of rotation of the pinion being at right angles to one another.

Figure 1:
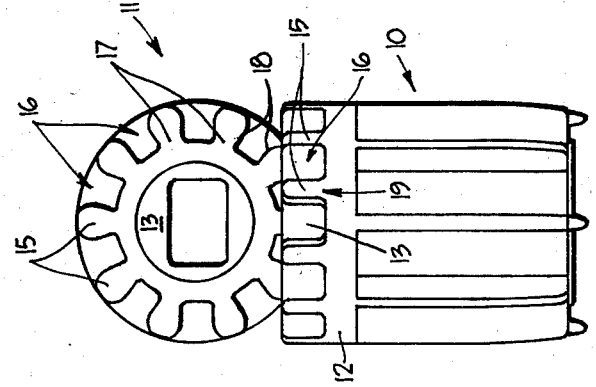
FIG. 1 is an elevation showing a clothes hoist handle pinion in mesh with a toothed nut.

Both the nut and pinion comprise a cylindrical base (in each instance designated 12) and a boss 13 coaxial with the base 12, of smaller diameter than the base 12 and extending from one end thereof. When each tooth 15 is viewed in side elevation, as of the toothed nut 10 in FIG. 1, it is seen to extend in an axial direction from the cylindrical base 12, and the recess 16 between any two adjacent teeth 15 is of general U-shape, and the tooth surfaces are chamfered or curved outwardly away from the centre of the recess at the tooth end. When each tooth 15 is viewed in end elevation as of the pinion 11 in FIG. 1, it is seen to have an undercut root 17, since the inner portions of the adjacent sides 18 of adjacent teeth are parallel, as for example if formed by a milling cutter. This results in each tooth 15 being bulbous, and the teeth of the two inter-engaging members can then inter-engage for a rotation exceeding the circumferential pitch of the teeth but with point engagement. Heretofore line engagement between teeth has been sought, so as to achieve low bearing pressures between surfaces, and high strength, but this is of small consequence since the teeth are formed from a resilient plastics material, and have the facility to deform. Since each tooth is supported not merely at its root 17 (which is relatively small and weak) but also at its base 19 (which is relatively large and strong), a relative small number of relatively large teeth can be incorporated in a relatively small diameter gear. This strength is of great importance in a clothes hoist where any one tooth may at any time be subjected to high forces. In a clothes hoist, close tolerances are difficult to maintain, but in this construction, wherein point contact exists between the teeth, absence of close tolerances is of little consequence. The teeth will mesh satisfactorily even if there are wide variations of angle and dimension between the driving pinion and the driven toothed nut.

Figure 3:
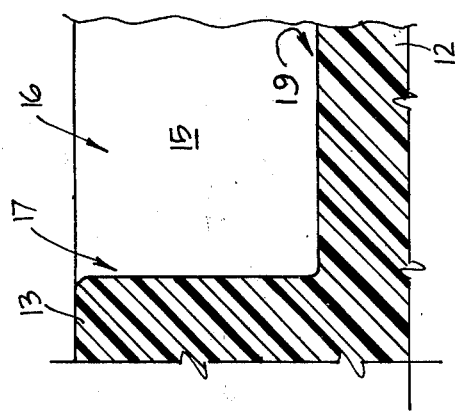
FIG. 3 is a fragmentary section taken on line 3—3 of FIG. 2.
Figure 2:
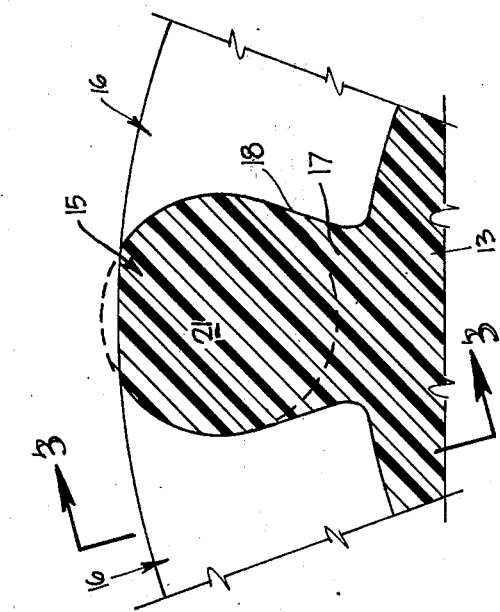
FIG. 2 is an enlarged sectional view of a tooth.

FIG. 2 illustrates the tooth form. The bulbous portion of the nut is designated 21, and is formed primarily by a circular cutting tool (end cutting milling tool) in a die workpiece. The parallel sides 15 are also formed by a simple milling process, so that the die costs are much lower than they would be for a bevel gear. Furthermore, after moulding, the separation of moulded workpiece and die takes place in an axial direction, as would be the case with a bevel gear.

Various modifications in structure and/or function may be made by one skilled in the art to the disclosed embodiments without departing from the scope of the invention as defined by the claims.

What is claimed is:

1. An angle meshing gear which is co-operable with a similar angle meshing gear when the gear axes of rotation are inclined to one another, comprising:
   a cylindrical base,
   a boss of smaller diameter than the base, coaxial with the base, and projecting from the base, and
   a plurality of teeth extending radially from the boss, each tooth having its root integral with the boss and one end integral with the cylindrical base, adjacent walls of adjacent teeth being substantially parallel for portions of their lengths, the tooth forms being bulbous.

2. An angle meshing gear according to claim 1 wherein further portions of the tooth walls are circularly curved.

3. An angle meshing gear according to claim 1 wherein each pair of adjacent said teeth define between them a U-shaped recess in side elevation, but the tooth surfaces curve outwardly away from one another on opposite sides of the recess at the tooth ends.

4. An angle meshing gear according to claim 1 wherein said gear comprises die formed polymeric material.

* * * * *